Patented May 2, 1933

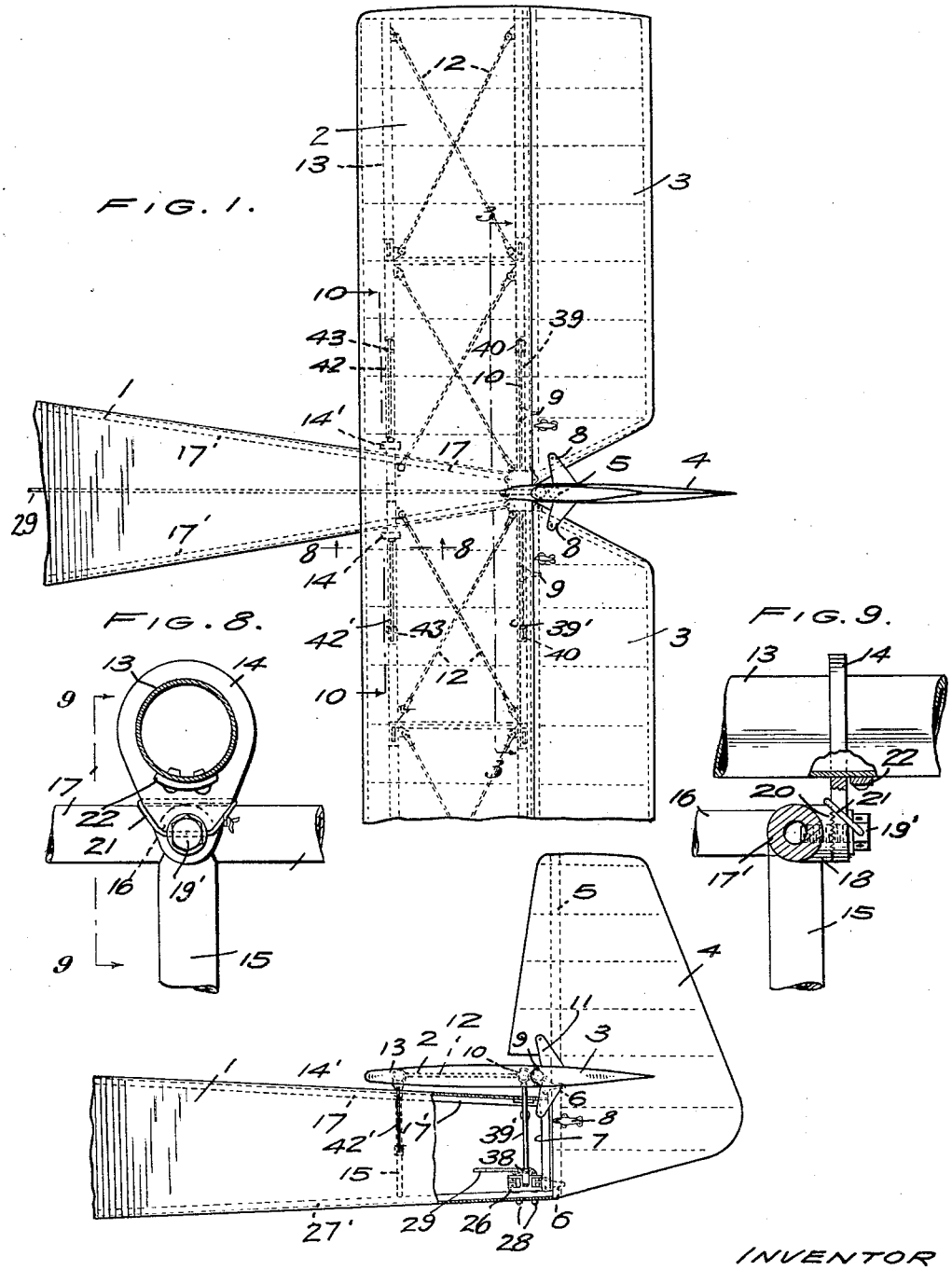

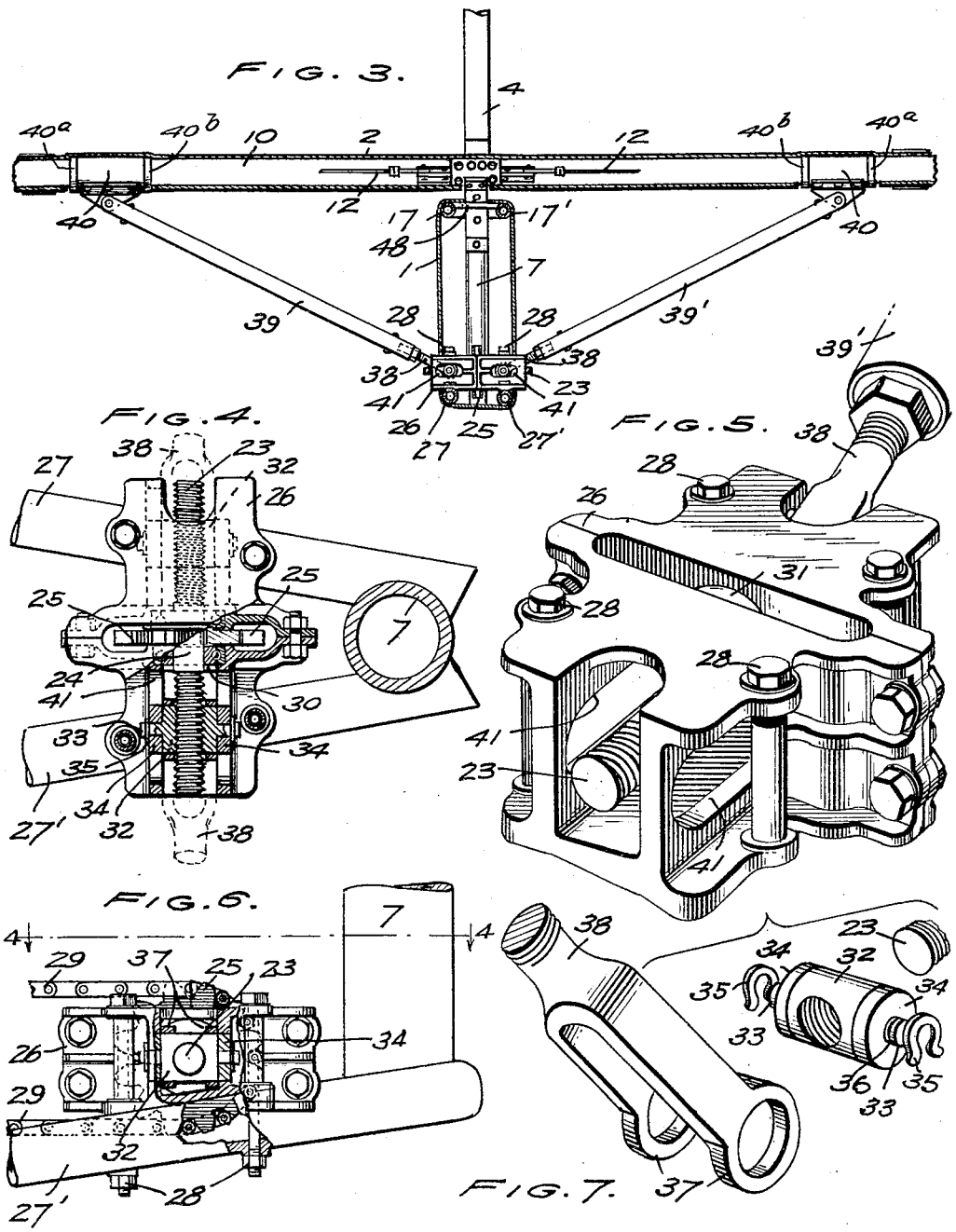

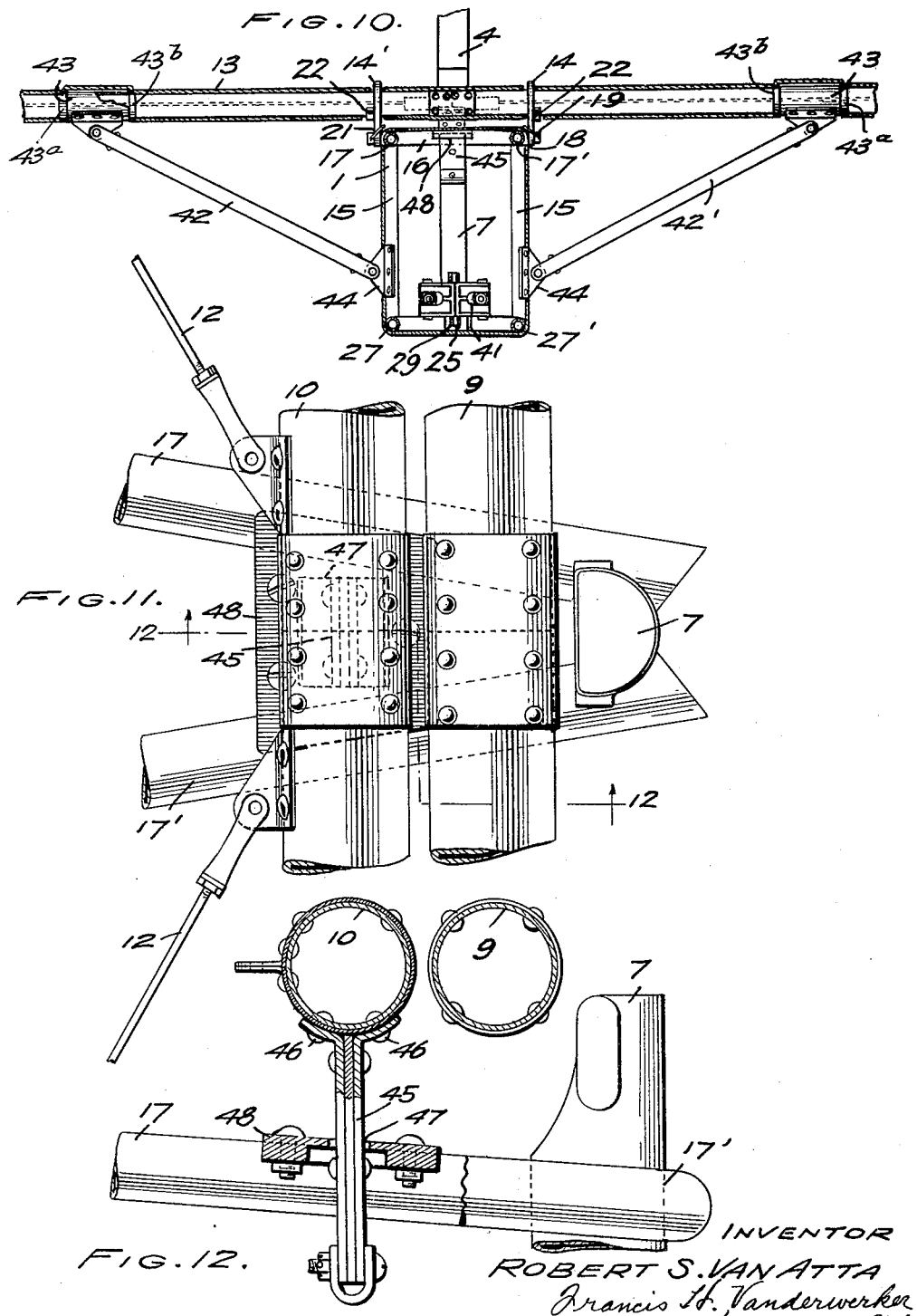

1,907,374

UNITED STATES PATENT OFFICE

ROBERT S. VAN ATTA, OF ROCHESTER, NEW YORK

STABILIZER CONTROL

Application filed April 9, 1932. Serial No. 604,339.

This invention relates to improvements in control systems for airplanes and particularly to a stabilizer control of the type embodying a screw attached to the fuselage and operated from the pilot's cockpit for altering the angle of setting of the stabilizer or tail plane for longitudinal balance.

The objects of the improvements are, first, to reduce or eliminate bending of the screw to insure ease of operation; second, to reduce or eliminate possible rotational vibration of the tail plane about a vertical axis; third, to support or brace the tail plane from the fuselage to obtain greater torsional rigidity of the tail plane; fourth, to provide for the location of the adjusting screw transversely of the longitudinal line of the fuselage with the consequent elimination of right angle turns in the operating cable and the resultant friction; and, fifth, to provide a generally improved operating mechanism capable of being assembled into a complete compact unit and adapted to be carried by the fuselage without distortion or misalignment from the weaving of the structure.

These objects are attained by the mechanism illustrated in the accompanying drawings, in which:—

Fig. 1 is a top plan of the empennage or tail unit of an airplane embodying the invention;

Figure 2 is a side elevation;

Figure 3 is a section on line 3—3 of Fig. 1;

Figure 4 is a section on line 4—4 of Fig. 6.

Figure 5 is a detail perspective view on an enlarged scale of the screw housing and associated parts;

Figure 6 is a side elevation of the structure shown in Fig. 4;

Figure 7 is a detail view of the strut fitting and bearing;

Figure 8 is a section on line 8—8 of Fig. 1;

Figure 9 is a section on line 9—9 of Fig. 8;

Figure 10 is a section on line 10—10 of Fig. 1;

Figure 11 is a top plan of the tongue and slot feature, and

Figure 12 is a section on line 12—12 of Fig. 11.

In the drawings, 1 designates the tail end of the fuselage upon which is mounted the empennage or tail unit including the stabilizer or tail plane 2, elevators 3, and rudder 4. The fuselage is rectangular in cross section and of the tube type of construction consisting of four longerons connected by vertical members and horizontal or cross members. The rudder post 5 is connected for movement about a vertical axis by hinges 6 to the tail post 7 of the fuselage and the usual rudder horns 8 are provided for connection with the conventional rudder control. The elevators 3 are hingedly connected as indicated at 9, to the rear spar 10 of the tail plane 2 for movement about a horizontal axis and are also provided with the usual operating levers or elevator horns 11. The rods 12 connect the rear spar 10 of the stabilizer with the front spar 13.

The front spar 13 of the tail plane 2 is rotatably supported in a pair of bearing brackets 14 and 14' to permit adjustment of the tail plane about a horizontal axis for altering the angular setting of the stabilizer. The bearing brackets are releasably fixed on respectively opposite sides of the fuselage at the junction of the vertical side members 15 and the cross member 16 with the upper longerons 17 and 17'. Each upper longeron is provided with a boss 18 to which is secured by means of the screw 19 one of the bearing brackets 14 and 14'; the contacting faces of the boss and bracket being grooved to provide complementary intermeshing ribs 20 reinforcing the connection against torsional stresses. The screw 19 may be secured against displacement by a wire loop 21, as shown to advantage in Figs. 8 and 9. Stop members 22 secured to the underside of the front spar 13 adjacent the outer faces of the bearing brackets limit the longitudinal movement of the spar relative to the brackets.

The mechanism for adjusting the tail plane or stabilizer 2 when altering the angle of incidence includes a screw 23 having right and left hand threaded portions separated by a short intermediate portion 24 of rectangular cross section upon which is mounted a sprocket 25. The screw and sprocket are contained in a housing 26 attached to the lower longerons 27—27' of the fuselage by fastening means 28 with the screw disposed horizontally and transversely of the longitudinal axis of the fuselage. The screw is actuated from the pilot's cockpit by suitable control means including a chain 29 engaging the sprocket 25. Experience has shown that in mechanisms of this type, it is necessary to reduce or eliminate bending of the screw to insure ease of operation because when the screw becomes subject to a bending movement there is induced a binding action between male and female threads which may be so great that the pilot, through his control apparatus, is unable to operate the screw. An advantage of the present construction is that the bearing load due to the pull exerted by the chain over the sprocket is taken up by two bearings 3 and 31 supporting the screw and located immediately adjacent the sprocket as shown in Fig. 4. By using a thin sprocket wheel and placing the bearings on the screw shaft close to the sides of the sprocket, the distance between the bearings is so small that the pull on the chain produces practically no bending of the screw.

The threaded portions of the screw work in threaded trunnions or nuts 32 from opposite ends of which project studs 33 supporting rollers 34 held in place on the studs by retaining clips 35 engaging slots or grooves 36 in the studs. Embracing the trunnions 32, inwardly of the rollers 34 are the bearing loops 37 of yokes 38 attached to the lower ends of two external struts 39—39', the upper ends of which are pin-connected to bearing sleeves 40 loosely embracing the rear spar 10 of the stabilizer and confined laterally between two stops at collars 40a and 40b encircling the spar and riveted or bolted thereto. When the screw 23 is turned in one direction, the trunnions 32 are moved apart, causing the struts 39—39' to be moved outwardly at their lower ends, thus raising the upper ends of the struts and also that part of the stabilizer 2 attached thereto. As the stabilizer is hinged to the fuselage at points 14 and 14', the effect of the motion is to change the stabilizer incidence. In the present disclosure, the stabilizer is shown and described as being hinged near its leading edge and operated at the rear but it will be understood that the device could also be designed to operate the front of the stabilizer, in which case the hinge would be located at the rear of the stabilizer.

The rollers 34 of the strut-trunnions 32 move and are supported in guide slots or ways 41 in the side walls of the housing 26, which guide slots are substantially co-extensive with the threaded portions of the screw and furnish supports for the rollers at all times during the full limit of their linear travel. This construction is of material advantage in that all stresses coming from the struts 39—39' which might cause bending stresses in the screw are not put upon the screw at all but are carried instead through the rollers and housing direct to the fuselage frame, leaving the screw to carry only direct tension or compression.

An additional pair of struts 42 and 42' support the tail plane or stabilizer adjacent its leading edge. These struts are pivotally connected at their upper ends, to sleeves 43 loosely embracing the tubular front spar 13 of the stabilizer between stops 43a and 43b at points spaced outwardly from opposite sides of the fuselage, as illustrated in Fig. 10. At their lower ends, the struts 42 and 42' are pivotally connected to suitable brackets 44, attached to the vertical side members 15 of the fuselage frame. The front struts 42 and 42', together with the rear struts 39 and 39', efficiently brace the tail plane from the fuselage and greater torsional rigidity of the stabilizer results from the four supporting struts being carried down to the fuselage at four widely separated points in the manner herein described and illustrated instead of being brought together to form an apex as in some existing devices.

Considering possible rotational vibration of the tail plane about a vertical axis, which vibration might be produced by unbalanced drag loads on the two halves of the tail plane on either side of the fuselage, the moment to resist such rotation is provided by the reactions at the hinge bearings, the necessary clearance in which bearings may allow considerable amplitude to the vibration. To reduce this amplitude of vibration and to provide additional rigidity to the structure, the present invention also embodies the tongue and slot feature shown in detail in Figs. 11 and 12. The tongue 45 is rigidly attached at 46 to the rear spar 10 of the tail plane and the slot 47 is provided in a plate 48 rigidly attached to the top longerons 17—17' of the fuselage. The tongue depends into and below the slot, which extends transversely of the longitudinal line of the fuselage, and abuts the terminals of the slot to resist any tendency of the tail plane to rotate about a vertical axis without interfering with the angular setting of the tail plane. The longitudinal distance between the bearings 14—14' and the tongue and slot being much greater than the transverse distance between the two bearings, the necessary clearance in bearings and between tongue and slot will permit less amplitude of vibration and make the tail plane more rigid with respect to the fuselage.

The assembling of the screw in the housing with bearings, trunnions, and guides, makes a unit complete in itself which can be attached bodily to the fuselage without distortion and misalignment, thus insuring freedom from friction and binding. Within wide limits, any operating ratio may be obtained in the design by the proper combination of hand wheel control, size of sprockets, pitch of screw threads and slope of external struts.

Having thus described the invention, what is claimed is:

1. The combination with a fuselage having an adjustable stabilizer, of a stabilizer adjusting mechanism including a screw mounted in the fuselage for rotation about an axis transversely thereof and having right and left hand threaded portions, a sprocket fixed to the screw intermediate the threaded portions, fixed bearings supporting the screw immediately next to the sprocket, guides adjacent the threaded portions of the screw, trunnions slidably supported in the guides and threadedly engaged with the threaded portions of the screw, a fitting rotatably secured to each trunnion for movement about a horizontal axis, struts attached at their lower ends to the said fittings and at their upper ends being hingedly connected to the stabilizer, and means for imparting rotation to the said sprocket.

2. In an aircraft, a tail unit including a tail plane movable about a horizontal transverse axis for varying the angle of incidence, a slotted plate fixed to the fuselage beneath the tail plane, and a rigidly attached tongue depending from said tail plane and engaged in the slot of the said plate to hold the tail plane against possible rotational vibration about an approximately vertical axis.

3. In an aircraft, a tail unit including bearings fixed on the fuselage and spaced apart transversely thereof, a slotted member fixedly mounted on the fuselage in longitudinally spaced relation to the said bearings, a tail plane pivotally supported in said bearings for movement about a horizontal transverse axis, and a rigidly attached tongue depending from said tail plane and engaged in the slot of the said member to hold the tail plane against rotational vibration about a vertical axis.

4. In an aircraft, a tail unit including bearings fixed on the fuselage and spaced apart transversely therof, a slotted member fixedly mounted on the fuselage in longitudinally spaced relation to the said bearings, a tail plane pivotally supported in said bearings for movement about a horizontal transverse axis, and a rigidly attached tongue depending from said tail plane and engaged in the slot of the said member to hold the tail plane against rotational vibration about a vertical axis, the longitudinal distance between the bearings and the slot being much greater than the transverse distance between the bearings to reduce to a minimum the amplitude of vibration permitted by the necessary clearance in bearings and between the tongue and slot.

5. In an adjustable stabilizer control for altering the angular setting of the stabilizer, an adjusting mechanism including a screw mounted on the fuselage and operated by control means from the cockpit, a cylindrical nut working on said screw, rollers carried by said nut, guideways for said rollers, a yoke loosely encircling said cylindrical nut and secured to the nut so as to be moved by the displacement of said nut, and a strut connecting the yoke with the adjustable stabilizer.

6. An adjusting mechanism for an airplane stabilizer comprising a screw-housing having a vertical transverse central sprocket-receiving opening and spaced parallel guide slots on opposite sides of the said central opening and elongated in a direction at right angles to the vertical plane of the opening, bearings on each side of said opening, a screw rotatably supported in said bearings and having right and left hand threaded portion, a relative thin sprocket within said opening and fixed on a central part of said screw, an operating chain trained around said sprocket, a cylindrical nut on each threaded portion of the screw, rollers carried by said nuts and engaging in said guide slots, yokes embracing the said cylindrical nuts and having means for connection with stabilizer struts, and means on said screw-housing for attaching same to an airplane fuselage.

7. In an airplane construction, a pair of upper longérons respectively provided with an outwardly disposed lateral boss, a vertically disposed bearing bracket associated with each boss, each bracket having a circular bearing opening in its upper portion and having a lower portion in contact with the boss, the relatively contacting portions of the boss and bracket having complementary intermeshing elements, a connecting screw securing the bracket and boss together, a stabilizer having a tubular spar journaled in said brackets, and stop members on the said spar and adjacent the outer faces of the brackets to limit longitudinal movement of the spar relative to the brackets.

In testimony whereof I affix my signature.

ROBERT S. VAN ATTA.